United States Patent
Mochinaga et al.

(10) Patent No.: US 7,431,653 B2
(45) Date of Patent: Oct. 7, 2008

(54) SLIDING TYPE CONSTANT VELOCITY UNIVERSAL JOINT

(75) Inventors: Shuji Mochinaga, Shizuoka-ken (JP); Manabu Hoshino, Shizuoka-ken (JP); Katsuhiro Suzuki, Shizuoka-ken (JP); Tomoaki Kaneko, Shizuoka-ken (JP); Masazumi Kobayashi, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 11/035,058

(22) Filed: Jan. 14, 2005

(65) Prior Publication Data

US 2005/0170898 A1  Aug. 4, 2005

(30) Foreign Application Priority Data

Jan. 20, 2004 (JP) ............... 2004-012080
Jan. 20, 2004 (JP) ............... 2004-012111

(51) Int. Cl.
*F16D 3/00* (2006.01)

(52) U.S. Cl. ....................... 464/146; 464/906
(58) Field of Classification Search ......... 464/144–146, 464/906
See application file for complete search history.

(56) References Cited

U.S. PATENT DOCUMENTS

| | | | | |
|---|---|---|---|---|
| 3,106,077 A | * | 10/1963 | Sharp | 464/146 |
| 4,205,925 A | * | 6/1980 | Fisher | 464/906 |
| 4,678,453 A | * | 7/1987 | Aucktor et al. | 464/144 |
| 6,354,604 B1 | * | 3/2002 | Nicolai | 464/143 |

FOREIGN PATENT DOCUMENTS

| | | |
|---|---|---|
| DE | 198 58 323 A1 | 6/2000 |
| JP | 61-124732 A | 6/1986 |
| JP | 2003-176833 A | 6/2003 |

* cited by examiner

*Primary Examiner*—Aaron M Dunwoody
(74) *Attorney, Agent, or Firm*—Arent Fox LLP

(57) ABSTRACT

The constant velocity universal joint includes a plurality of vehicle body attachment flanges provided apart from each other in the outer circumferential direction of the joint outer ring and partly protruding in the radial direction. The joint outer ring has a flower outer circumferential shape corresponding to the inner circumferential shape, and the vehicle body attachment flanges are provided at outer recesses positioned between the track grooves of the joint outer ring. In this joint, the number of the balls is six, and the pitches of the ball tracks are random, unequal and not less than 55 degree.

3 Claims, 14 Drawing Sheets

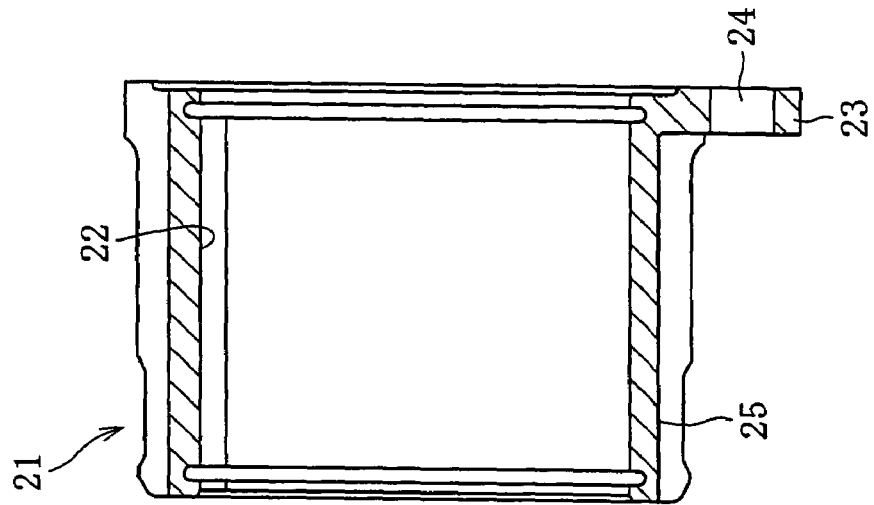
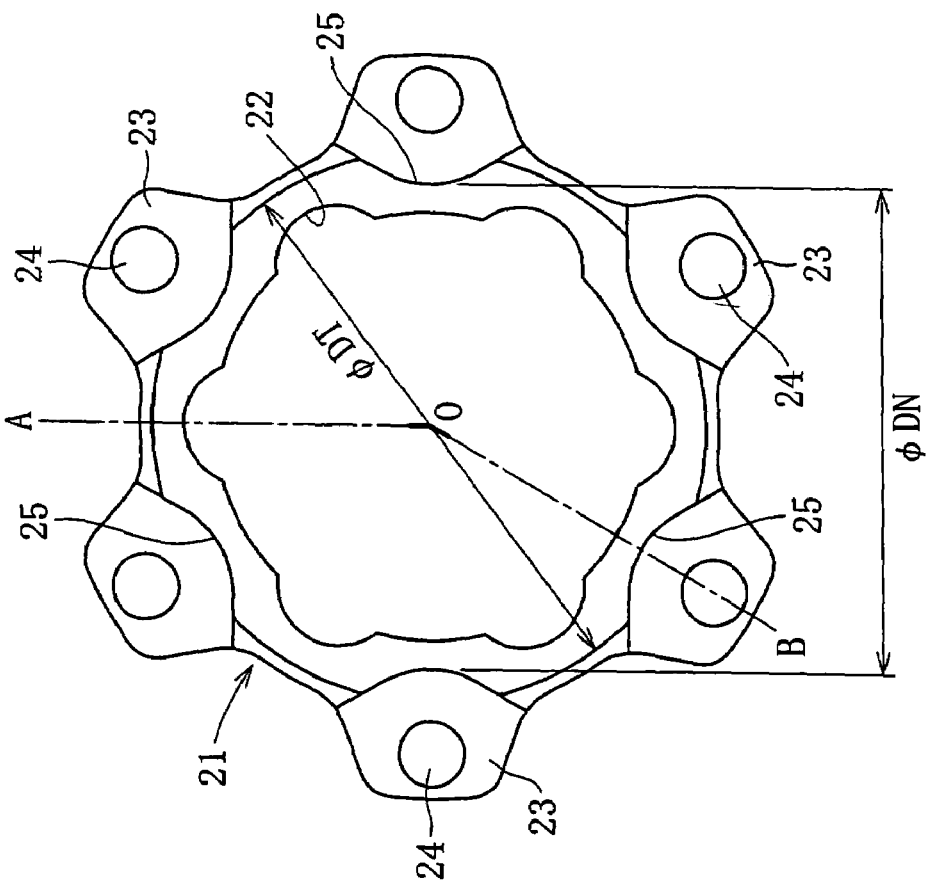
FIG. 1b
FIG. 1a

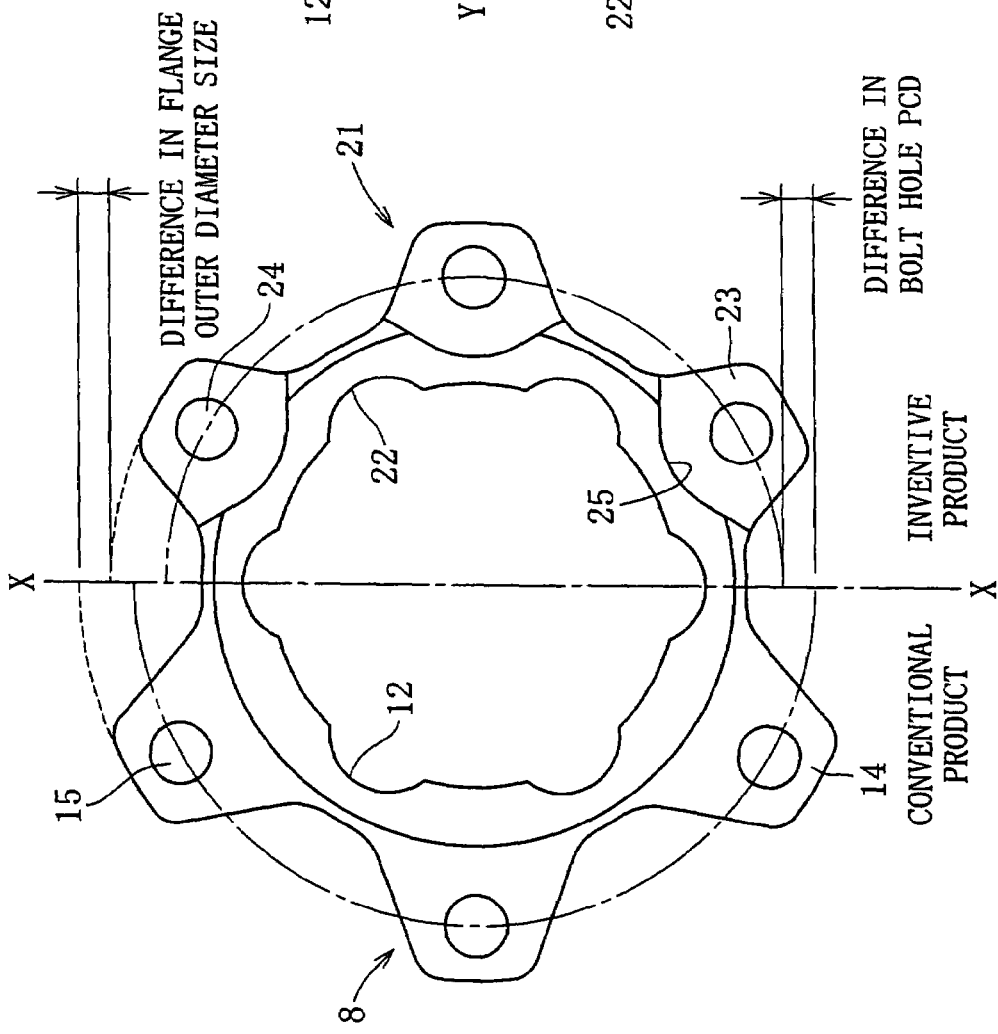
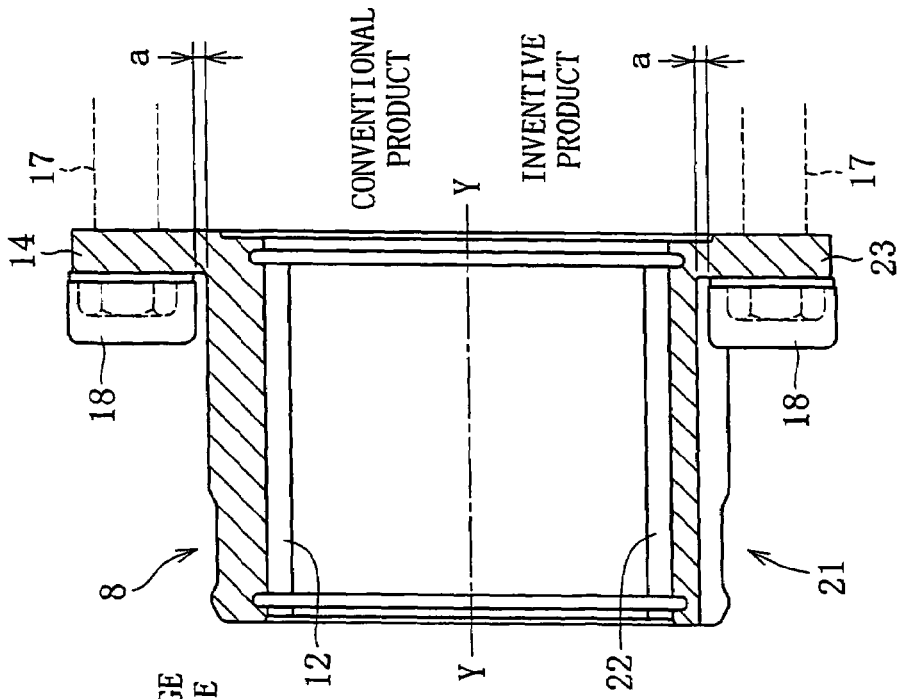

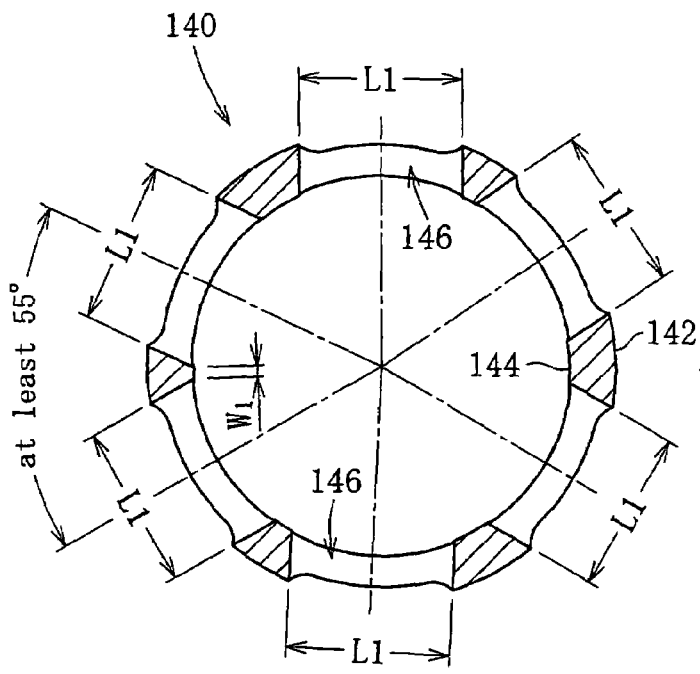
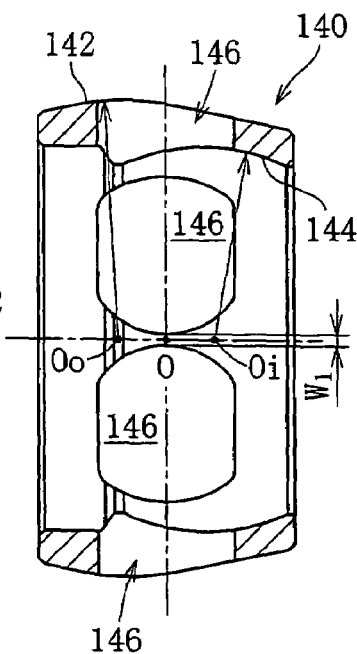
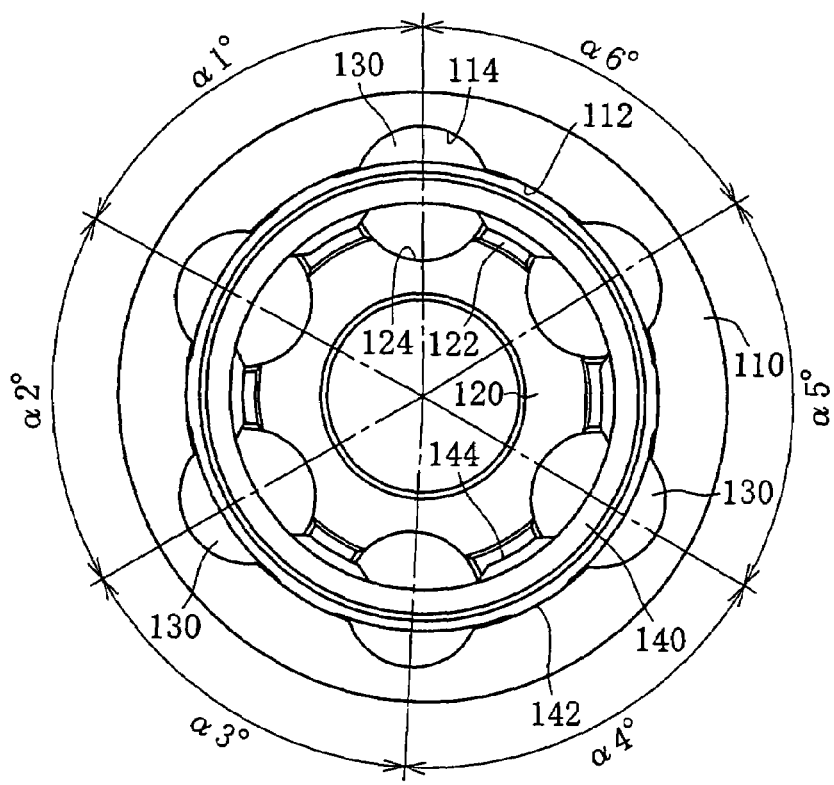

ANGLE (deg)

ANGLE (deg)

ANGLE (deg)

ANGLE (deg)

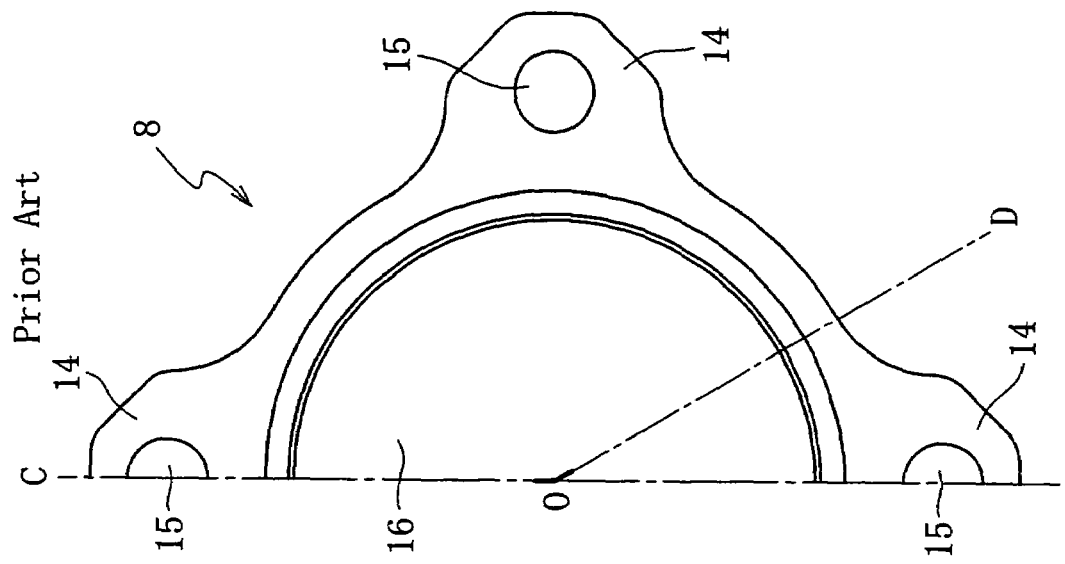
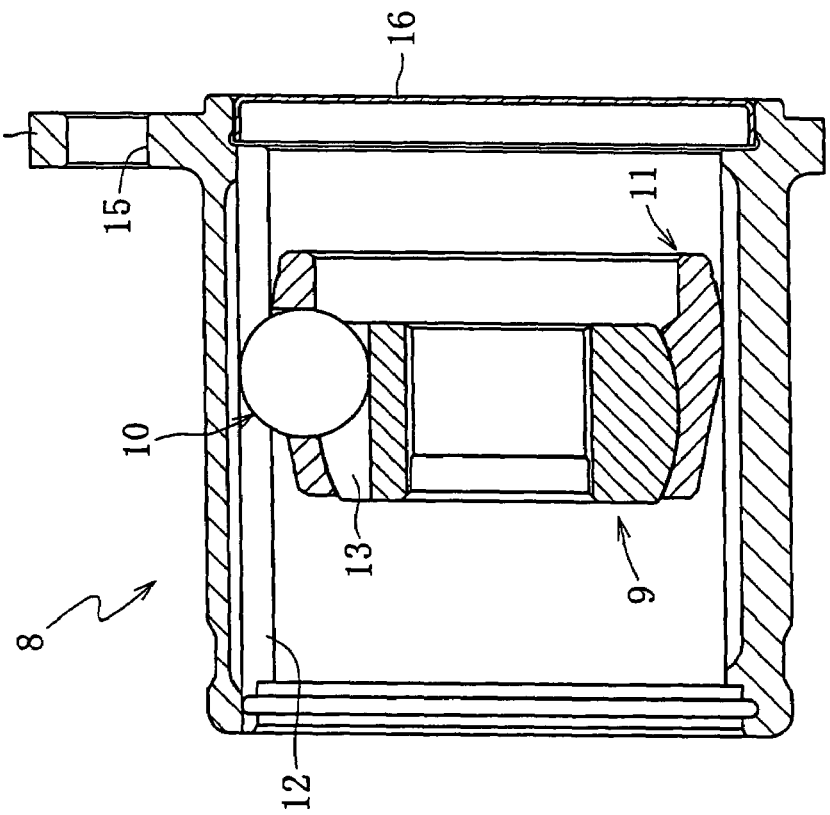
FIG. 22a Prior Art
FIG. 22b Prior Art

SLIDING TYPE CONSTANT VELOCITY UNIVERSAL JOINT

BACKGROUND ART

The present invention relates to sliding type constant velocity universal joints for use in power transmission mechanisms, for example, in automobiles and various kinds of industrial machines that allow axial displacement and angular displacement between two axes on the driving side and the driven side.

A power transmission mechanism that transmits power from the engine of an automobile to a drive wheel must respond to angular displacement and axial displacement based on changes in the relative positional relation between the engine and the wheel. Therefore, for example as shown in FIG. 21, an intermediate shaft 1 is interposed between the engine side and the drive wheel side, one end of the intermediate shaft 1 is coupled to a differential 3 through a sliding type constant velocity universal joint 2, and the other end thereof is coupled to the drive wheel 6 through a fixed type constant velocity universal joint 4 and a wheel bearing 5.

In the sliding type constant velocity universal joint 2 described above, not only angular displacement but also axial displacement is absorbed by so-called plunging, while in the fixed type constant velocity universal joint 4, only the angular displacement can be absorbed. The sliding type constant velocity universal joint 2, the fixed type constant velocity universal joint 4, and the intermediate shaft 1 constitute a drive shaft 7 as a unit, and as the drive shaft 7 is mounted in the vehicle body, the constant velocity universal joints 2 and 4 are set at prescribed operation angles. The operation angles of the constant velocity universal joints 2 and 4 sequentially change, and therefore, in general, among these joints 2 and 4, the fixed type constant velocity universal joint 4 is used on the outboard side and the sliding type constant velocity universal joint 2 is used on the inboard side to respond to the changing operation angles.

A double offset type constant velocity universal joint (DOJ) is well known as the sliding type constant velocity universal joint 2. As shown in FIGS. 22a and 22b, the constant velocity universal joint includes, as essential elements, a joint outer ring 8 attached to a differential 3 on the vehicle body side, a joint inner ring 9 attached to one end of the intermediate shaft 1, a plurality of balls 10 incorporated between the joint outer ring 8 and the joint inner ring 9, and a cage 11 interposed between the joint outer ring 8 and the joint inner ring 9 to support the balls 10. Note that a lid 16 to cover the opening is provided at the end of the joint outer ring 8 on the differential side.

The joint outer ring 8 is in the shape of a cup having a plurality of linear track grooves 12 parallel to its axial line and in its inner circumference at equal intervals in its circumferential direction. A plurality of linear track grooves 13 parallel to its axial line and corresponding to the track grooves 12 are provided in the outer circumference of the joint inner ring 9. The track grooves 12 and 13 in the joint outer ring 8 and the joint inner ring 9 cooperate with each other to define ball tracks in which the balls 10 transmitting torque are provided. The balls 10 are supported in the cage 11 interposed between the joint outer ring 8 and the joint inner ring 9. In the constant velocity universal joint, when an operation angle is set between the joint outer ring 8 and the joint inner ring 9, the cage 11 controls the balls 10 to be on the bisector plane of the operation angle so that the constant velocity is maintained.

Various types of rings may be used for the joint outer ring 8 in the constant velocity universal joint 2 depending on how the joint is attached to the vehicle body, and the one shown in FIGS. 22a and 22b is of flange type. The flange type joint outer ring 8 has protruding vehicle body attachment flanges 14 integrally formed at equal intervals in the circumferential direction at the outer circumferential end, and is attached to the differential 3 (see FIG. 21) by fastening bolts using the bolt holes 15 formed through the flanges 14. In the field of constant velocity universal joints, products having a joint outer ring 8 with a flower outer circumferential shape formed corresponding to the inner circumferential shape have been used in order to meet recent demands for lightweight and compact products (see for example, Japanese Patent Laid-Open Application No. Hei 5-231436).

The constant velocity universal joint having the flange type joint outer ring 8 has the plurality of vehicle body attachment flanges 14 protruding radially outwardly at the outer circumference of the joint outer ring 8 as described above, and the bolts are inserted through the bolt holes 15 in the vehicle body attachment flanges 14 for attachment to the differential on the vehicle body side.

As shown in FIGS. 23a and 23b, when the bolts are fastened to attach the joint outer ring 8, a fastening tool (socket 18 as shown) is used, and therefore there should be a space a from the outer circumference of the joint outer ring 8 for inserting the tool. Therefore, in consideration of the attaching process using the fastening tool, the necessity of providing the space a from the outer side of the joint outer ring 8 and the bolt holes 15 in the flanges 14 causes the outer diameter size of the vehicle body attachment flanges 14 to increase, which increases the weight of the constant velocity universal joint.

In the constant velocity universal joint, the number of balls 10 is typically six or eight, and the balls 10 are normally arranged in the circumferential direction at six equal pitch intervals (60°) or eight equal pitch intervals (45°). In this constant velocity universal joint, as shown in FIG. 23b, the balls 10 are provided at equal pitch intervals of 60°. If the number of the balls is not six or eight, the balls are arranged at equal pitch intervals in the circumferential direction.

In the constant velocity universal joint of this kind, when the torque is loaded and rotation is carried out, in other words, when power is transmitted, thrust force is induced in the axial direction of the constant velocity universal joint (induced thrust force), and the induced thrust force changes as many times as the number of the track grooves in one rotation. In the conventional constant velocity universal joint, the track grooves are arranged at equal intervals of 60°, and therefore the number of vibration frequency is six, which sometimes causes unnerving vibrations or muffled noises in resonance with the natural vibration frequency of the underbody of the vehicle.

DISCLOSURE OF THE INVENTION

An object of the present invention is to provide a constant velocity universal joint that can readily achieve reduction of the weight and size thereof by reducing the outer diameter of the joint outer ring using simple means.

The invention is directed to a constant velocity universal joint including an outer member provided with a plurality of track grooves formed in an inner circumference thereof, an inner member provided with track grooves corresponding to the track grooves of the outer member in an outer circumference, a plurality of balls provided in ball tracks defined by cooperation of the track grooves between the outer member and the inner member to transmit torque, and a cage having pockets for retaining the balls. The constant velocity universal joint has a plurality of vehicle body attachment flanges provided apart in a circumferential direction at an outer end of said outer member so as to outwardly protrude partially. In the universal joint, the outer circumferential shape of the outer member is in a flower shape corresponding to the inner circumferential shape, and the vehicle body attachment flanges are formed at outer circumferential recesses positioned between the track grooves of the outer member.

According to the present invention, since the outer circumferential shape of the outer member is formed in a flower shape corresponding to the inner circumferential shape, the weight thereof can be reduced while the load capacity of the constant velocity universal joint is maintained in the present level. In addition, the vehicle body attachment flanges provided at the outer circumferential recesses between the track grooves in the outer member in the flower shape allows the outer diameter size of the vehicle body attachment flanges to be reduced, and therefore the constant velocity universal joint can be more compact. Therefore the weight reduction and compactness of the constant velocity universal joint can improve the performance of the constant velocity universal joint and expand the applicable field thereof.

Regarding the outer circumferential shape of the outer member according to the invention, the ratio DN/DT of the outermost diameter size DT where the track grooves are positioned and the innermost diameter size DN where the vehicle body attachment flanges are located is desirably set in the range of from 0.85 to 0.95. The ratio of the outermost diameter size and the innermost diameter size is defined in the above-described range, so that the weight and size can be reduced as described above and the strength of the outer member can be secured.

Relative to the number of the track grooves of the outer member described above, an arbitrary number of the vehicle body attachment flanges can be provided. In other words, instead of providing vehicle body attachment flanges in all the outer circumferential recesses positioned between the track grooves of the outer member, vehicle body attachment flanges may be provided only in part of the outer circumferential recesses.

The present invention is applicable to a constant velocity universal joint having eight balls incorporated. With the eight balls, the ball PCD can be reduced as compared to a constant velocity universal joint with six balls and the size can effectively be reduced.

Another object of the invention is to attempt to improve countermeasure against the unnerving vibrations, muffled noises and the like.

According to the invention, a constant velocity universal joint includes an outer member having a plurality of axially extending track grooves formed in a cylindrical inner circumferential surface thereof, an inner member having a plurality of axially extending track grooves in a spherical outer circumferential surface thereof, balls each incorporated in a ball track formed by a pair of the track groove of the outer member and the track groove of the inner member, and a cage having pockets for holding the balls. The center of the outer spherical surface of the cage and the center of the inner spherical surface are offset from each other by an equal distance axially in the opposite directions from the cage center. The number of the balls is six, and the pitches of the ball tracks are random unequal pitches that are at least 55°. In the DOJ type, sliding type constant velocity universal joint, the track grooves of the outer member and the track grooves of the inner member are arranged with unequal pitches in the circumferential direction, so that in the DOJ with six balls, for example, the 6th order induced thrust force can be reduced, and vibrations and muffled noises in the vehicle can be prevented.

In the DOJ with six torque transmission balls, in order to reduce the 6th order induced thrust force described above, the track grooves of the outer member and the track grooves of the inner member may be arranged with unequal pitches in the circumferential direction (see Japanese Patent Laid-Open Publication No. Hei 1-50767), but simply providing the tracks with unequal pitches might prevent other important requirements (such as strength and durability) for the constant velocity universal joint from being satisfied. The pitch between ball tracks that can satisfy the strength, durability, and NVH characteristics of a constant velocity universal joint should be at least 55°. In this case, the positions of the pockets of the cage should be in phase with the pitches of the track grooves of the outer member and the track grooves of the inner member. Note that this applies to products with the maximum operation angle in the range of from 20 to 25°, and the upper limit for the ball track pitch is 55° in order to secure the inter-pocket column width $W_1$ of the cage and the inter-track spherical surface width $W_2$ of the inner member. If the ball track pitch is less than 55°, the inter-pocket column width $W_1$ of the cage (FIG. 9a) and the spherical surface width $W_2$ of the inner member (FIG. 8a) are too small, and sufficient strength for a constant velocity universal joint cannot be provided.

The invention is characterized in that, in the constant velocity universal joint, the ball track pitch is a random unequal pitch within the range of 60°±3°. Since the pitches of the track grooves of the outer member and the track grooves of the inner member are set to 60°±3°, the pockets of the cage can have an equal window length and an equal pitch (60°). Note that this applies to constant velocity universal joints with the maximum operation angle in the range of from 20 to 25°. The ball track pitch is limited to the range of 60°±3° in order to secure the inter-pocket column width $W_3$ (FIG. 12a) necessary for securing the strength of the cage.

The invention is characterized in that, in the constant velocity universal joint, the pockets are provided with equal pitch in the circumferential direction and the window lengths are equal to each other. In this case, the window length $L_2$ of the pocket is set in consideration of deviations between track pitches (60°±3°) and the circumferential movement of the ball based on the maximum operation angle of the constant velocity universal joint. When the pockets of the cage have an equal window length, and can be set at equal pitch intervals, the constant velocity universal joint can be assembled significantly easily. More specifically, the outer member and the inner member need only be in phase.

The invention is characterized in that, in the constant velocity universal joint, in a section including the axial line of the joint, the inner spherical surface of the cage has the center of curvature in a location radially shifted from the center of curvature of the spherical outer circumferential surface of the inner member, and is formed with a greater radius of curvature than that of the spherical outer circumferential surface of the inner member. Here, axial clearances $\delta_2+\delta_2'$ in the range of from 5 to 50 μm are provided between the ball and the pocket of the cage. In this way, axial clearances $\delta_1$ and $\delta_1'$ are provided between the inner member and the cage, and the slide resistance in the joint is significantly reduced. Therefore, even when the constant velocity universal joint is used for a drive wheel in an automobile, and a relatively small torque is loaded for example during idling in an AT automobile, vibrations from the engine side can be absorbed and prevented from being transmitted to the vehicle body, and therefore the vibration of the vehicle body can be prevented.

The invention is characterized in that, in the constant velocity universal joint, the inner circumferential surface of the cage is formed by connecting the cylindrical surface extending for an arbitrary axial size in the center, and the spherical outer circumferential surface of the inner member and a partial spherical surface having the same radius of curvature located on the sides of the cylindrical surface, and axial clearances $\delta_2 + \delta_2'$ in the range of from 5 to 50 μm are provided between the ball and the pocket of the cage. In this way, axial clearances $\delta_3$ and $\delta_3'$ are provided between the inner member and the cage, so that the slide resistance in the joint is significantly reduced. Even when the constant velocity universal joint is used for a drive wheel in an automobile, and a relatively small torque is loaded for example during idling in an AT automobile, vibrations from the engine side can be absorbed and prevented from being transmitted to the vehicle body, and therefore the vibration of the vehicle can be prevented.

According to the invention, in the DOJ type, sliding type constant velocity universal joint having a plurality of balls, the pitch of the ball track formed by a pair of the track groove of the outer member and the track groove of the inner member is randomly set in such a range that various characteristics (such as strength, durability, and NVH) necessary for a constant velocity universal joint are provided as described above. In this way, the vibration cycle by induced thrust force is not constant, so that the vibrations, muffled noises, and the like in the vehicle can be reduced.

FIGS. 15 to 20 show measurement results of induced thrust force for a conventional DOJ with six balls and the inventive product with six balls. In these figures, the abscissa represents the operation angle (0° to 15°), and the ordinate represents induced thrust (N). The broken line represents the measurements for the conventional product, and the solid line represents the measurements for the inventive product. In the inventive product, not only the 6th order induced thrust force can sufficiently be reduced, but also the induced thrust force in all the other orders are not more than that of the conventional product. The ball track pitch in the inventive product is as shown in Example 1 in Table 1. Note that measurement was carried out for combinations in Examples 2 to 4 in Table 1, and substantially the same effect as that in Example 1 was observed.

TABLE 1

| Pitch | Example 1 | Example 2 | Example 3 | Example 4 |
|---|---|---|---|---|
| $\alpha_1$ | 55 | 55 | 55 | 58 |
| $\alpha_2$ | 70 | 65 | 59 | 61 |
| $\alpha_3$ | 55 | 55 | 65 | 61 |
| $\alpha_4$ | 55 | 65 | 61 | 63 |
| $\alpha_5$ | 70 | 55 | 57 | 60 |
| $\alpha_6$ | 55 | 65 | 63 | 57 |

BRIEF DESCRIPTION OF THE DRAWINGS

FIG. 1a is a front view showing an embodiment of a joint outer ring of a constant velocity universal joint according to the present invention.

FIG. 1b is a sectional view taken along the line A-O-B in FIG. 1a.

FIG. 2a is a diagram for comparison in the size of a joint outer ring between a conventional product and the inventive product, wherein is a front view showing the conventional product in the left part from the line X-X as the boundary and the inventive product in the right part.

FIG. 2b is a diagram for comparison in the size of a joint outer ring between a conventional product and the inventive product, wherein is a sectional view showing the conventional product in the upper part above the line Y-Y as the boundary and the inventive product in the lower part.

FIG. 9a is a front view of the cage in the DOJ of FIG. 6.

FIG. 9b is a longitudinal sectional view thereof.

FIG. 10 is a front view of a six-ball DOJ according to another embodiment.

FIG. 22a is a cross sectional view taken along the line C-O-D in FIG. 22b showing a conventional sliding type constant velocity universal joint.

FIG. 22b is a partly omitted front view showing a joint outer ring of a conventional sliding type constant velocity universal joint.

FIG. 23a is a cross sectional view showing the state in which a bolt and a socket are mounted to the joint outer ring of FIG. 22a.

DESCRIPTION OF THE PREFERRED EMBODIMENTS

Figure 3:
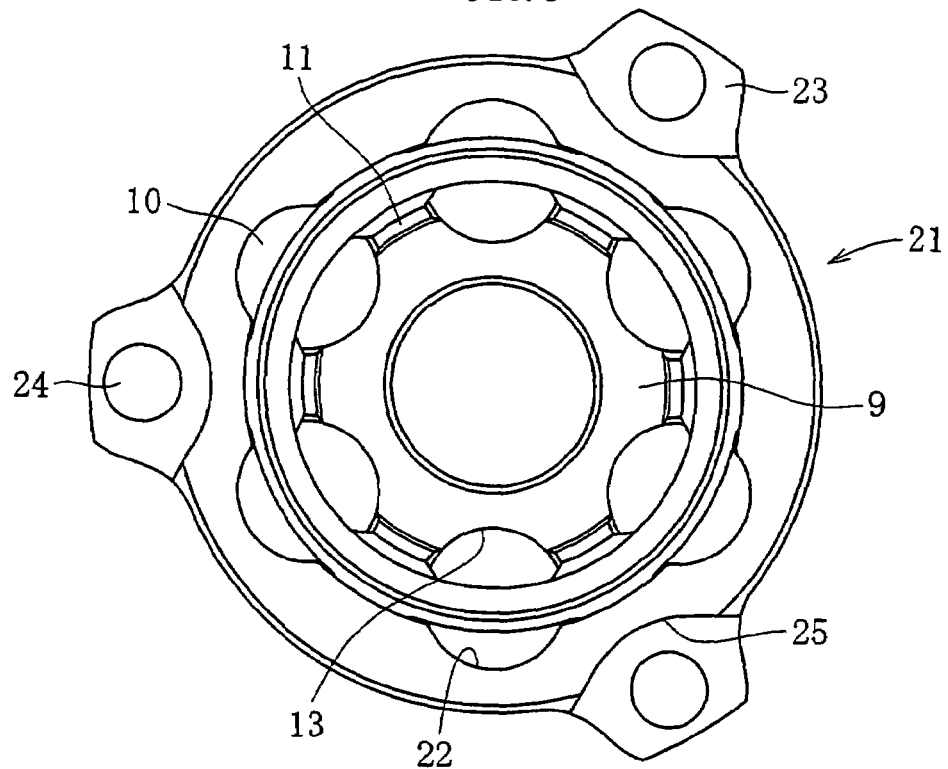
FIG. 3 is a front view of a six-ball constant velocity universal joint having three vehicle body attachment flanges showing another embodiment of the present invention.

Embodiments of the constant velocity universal joint according to the present invention shown in FIGS. 1 to 5 will be described in detail. The same or corresponding parts as or to those in the conventional constant velocity universal joints shown in FIGS. 22a, 22b, 23a, and 23b will be denoted by the same reference numerals.

Figure 21:
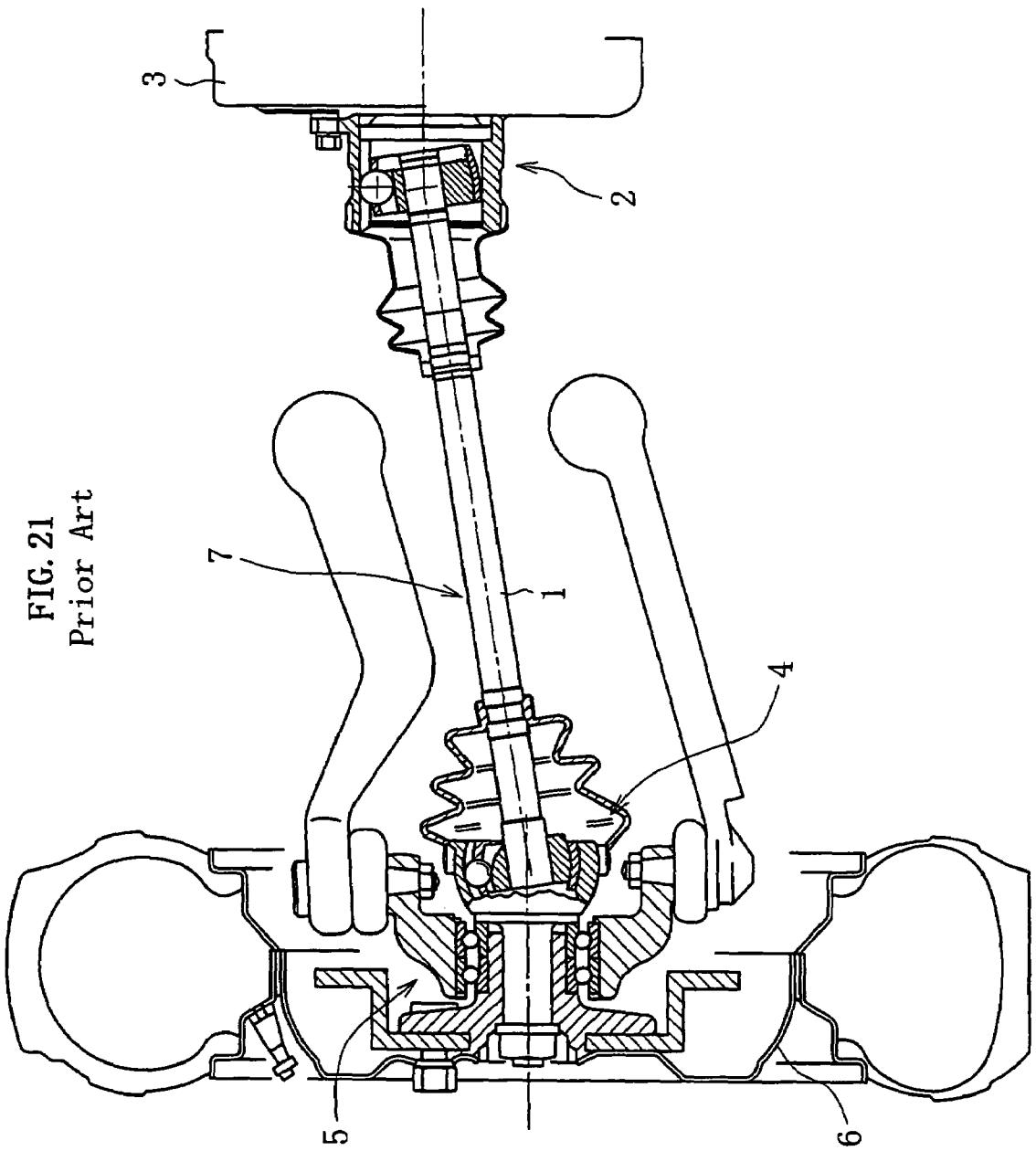
FIG. 21 is a cross sectional view of a sliding type constant velocity universal joint that constitutes a drive shaft of an automobile.
Figure 23B:
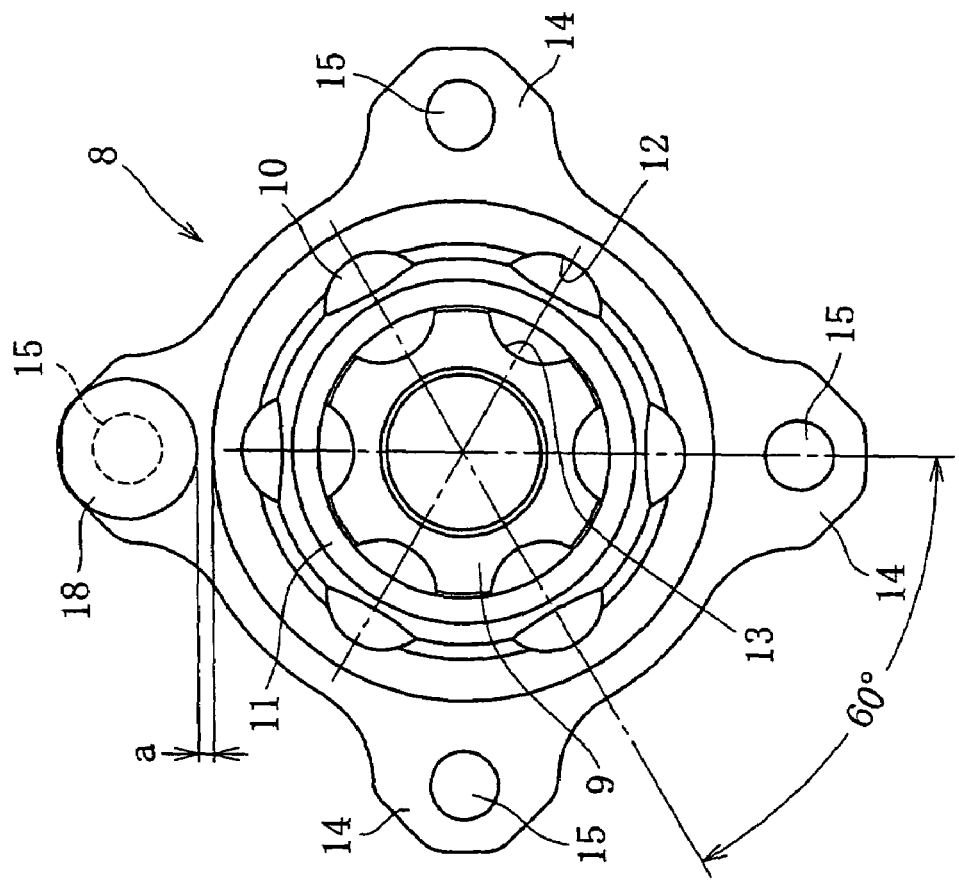
FIG. 23b a front view thereof.
Figure 23A:
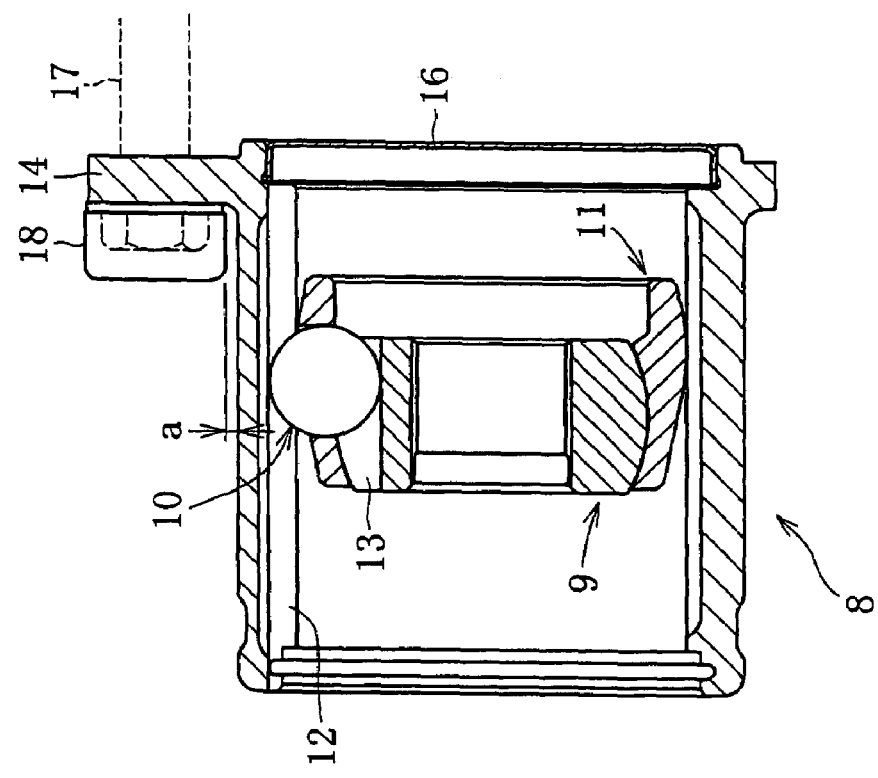

A sliding type constant velocity universal joint according to the embodiment shown in FIGS. 1a and 1b is a double offset type constant velocity universal joint (DOJ) that constitutes a drive shaft 7 (see FIG. 21) serving as a power transmission mechanism in an automobile and is coupled to a differential 3 on the vehicle body side. The constant velocity universal joint includes, as essential elements, a joint outer ring 21 as an outer member attached to the differential 3 on the vehicle body side, a joint inner ring 9 as an inner member attached to one end of an intermediate shaft 1, a plurality of balls 10 incorporated between the joint outer ring 21 and the joint inner ring 9, and a cage 11 interposed between the joint outer ring 21 and the joint inner ring 9 to support the balls. (refer to FIGS. 22a, 22b, 23a, and 23b, because the structure is the same as the conventional structure except for the joint outer ring 21.)

The joint outer ring 21 is in the shape of a cup having a plurality of linear track grooves 22 parallel to its axial line and in its inner circumference at equal intervals in the circumferential direction. The joint inner ring 9 has a plurality of linear track grooves 13 parallel to its axial line and corresponding to the track grooves 22 in its outer circumference. The track grooves 22 and 13 in the joint outer ring 21 and the joint inner ring 9 cooperate with each other to define the ball tracks in which the torque transmitting balls 10 are provided. The balls 10 are supported in the pockets of the cage 11 interposed between the joint outer ring 21 and the joint inner ring 9. In the constant velocity universal joint, when an operation angle is provided between the joint outer ring 21 and the joint inner ring 9, the cage 11 controls the balls 10 to be on the bisector plane of the operation angle, so that the constant velocity is maintained.

The joint outer ring 21 in the constant velocity universal joint is classified as a flange type ring based on how it is attached to the vehicle body. The flange type joint outer ring 21 uses a plurality of vehicle body attachment flanges 23 integrally provided at equal intervals in its circumferential direction at the outer end portion, and is attached to the differential 3 (see FIG. 21) by bolts fastened through bolt holes 24 formed through the vehicle body attachment flanges 23.

The joint outer ring 21 has a flower outer circumferential shape formed corresponding to the shape of the inner circumference (track grooves) for reducing the weight and size. Herein, the "flower shape" refers to a shape that has recesses 25 that are formed, between the positions of the track grooves 22 formed in the inner circumference, at the outer circumferential surface of the joint outer ring 21 so as to extend along the track grooves 22. The vehicle body attachment flanges 23 are provided at the outer circumferential recesses 25 positioned between the track grooves 22 of the joint outer ring 21.

In this way, the joint outer ring 21 has the flower outer circumferential shape corresponding to the inner circumferential shape, so that the constant velocity universal joint can be reduced in weight with its load capacity maintained in the present level. In addition, the vehicle body attachment flanges 23 are provided at the outer circumferential recesses 25 positioned between the track grooves 22 in the flower joint outer ring 21, so that the outer diameter size of the vehicle body attachment flanges 23 can be reduced and the constant velocity universal joint can be made compact.

FIG. 2 shows the conventional joint outer ring 8 and the inventive joint outer ring 21 as they are compared in size. In FIG. 2a, the left part from the line X-X as the boundary shows the conventional product and the right part shows the inventive product. In FIG. 2b, the upper part above the line Y-Y as the boundary shows the conventional product, and the lower part shows the inventive product.

In the comparison between the conventional product and the inventive product, the load capacity (size) of the constant velocity universal joint and the space a for inserting the tool are the same. In the comparison in the outer diameter size between the vehicle body attachment flanges 14 and 23, the inventive product can be reduced by about 10% with respect to the conventional product in size, and by about 20% in weight.

Herein, the joint outer ring 21 of the inventive product has a flower outer shape that is advantageous in terms of weight reduction, but the shape has a limitation in thickness in order to keep certain strength. More specifically, in order to reduce the weight by employing the flower shape and still keep satisfactory strength for the constant velocity universal joint, not only the thickness of the track groove portions but also the thickness of the portion between the track grooves is crucial.

Therefore, as shown in FIG. 1a, the ratio DN/DT of the outermost diameter size DT where the track grooves 22 are located and the innermost diameter size DN where the vehicle body attachment flanges 23 are located between the track grooves 22 should be set in the range of from 0.85 to 0.95. When the ratio of the outermost diameter size DT and the innermost diameter size DN is set in the above-described range, the weight and size can be reduced and the strength of the joint outer ring 21 can be secured simultaneously.

If the ratio DN/DT is smaller than 0.85, the portion of the joint outer ring 21 where the flanges 23 are located is too thin to provide strength required by the constant velocity universal joint. If the ratio DN/DT is greater than 0.95, the outer diameter size of the vehicle body attachment flanges 23 is too large, and the weight and size cannot be reduced.

Note that the number of the vehicle body attachment flanges 23 can arbitrarily be set based on the number of the track grooves 22 (balls 10) of the joint outer ring 21 described above. More specifically, instead of providing the vehicle body attachment flanges 23 in all the outer circumferential recesses 25 positioned between the track grooves 22 for all the track grooves 22 in the joint outer ring 21 as shown in FIGS. 1a, 1b, 2a, and 2b, vehicle body attachment flanges 23 may be provided only in part of the outer circumferential recesses 25. For example as shown in FIG. 3, the vehicle body attachment flanges 23 may be provided in three outer circumferential recesses 25 arranged at equal intervals in the circumferential direction of the joint outer ring 21.

Figure 4:
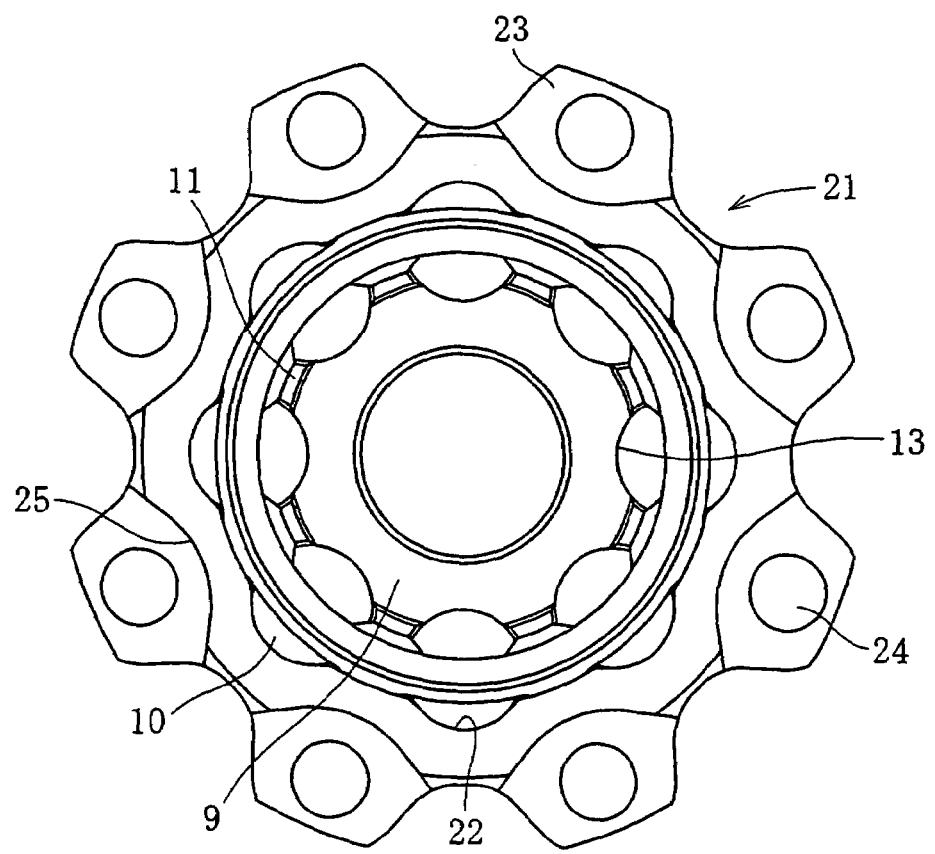
FIG. 4 is a front view of an eight-ball constant velocity universal joint having eight vehicle body attachment flanges showing another embodiment of the present invention.
Figure 5:
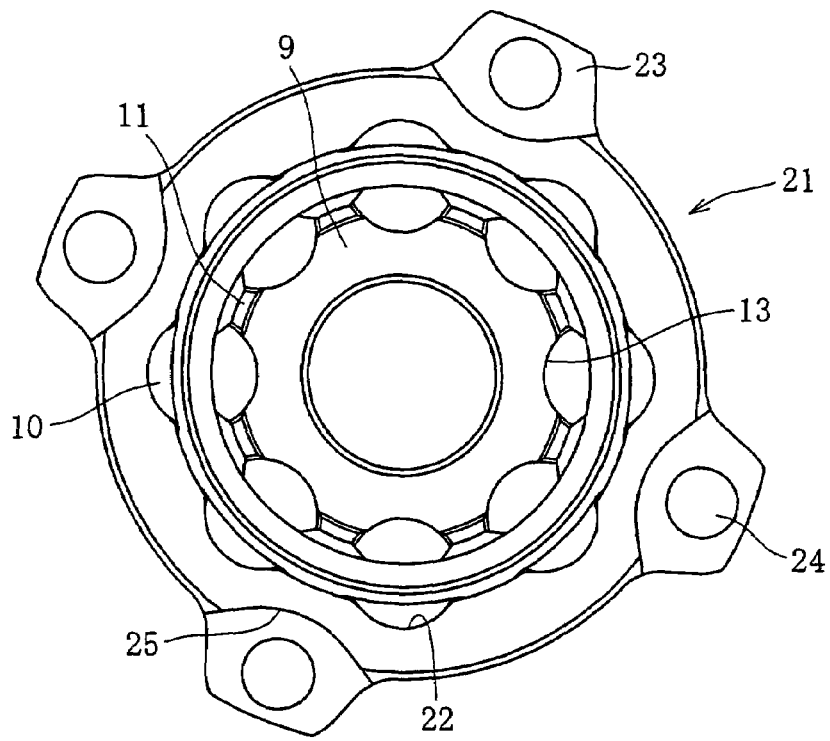
FIG. 5 is a front view of an eight-ball constant velocity universal joint having four vehicle body attachment flanges showing another embodiment of the present invention.

In the above example, although six balls 10 are incorporated in the constant velocity universal joint, the embodiment may be applied to a constant velocity universal joint in which eight balls 10 are incorporated. With eight balls 10, the ball PCD may be reduced and the joint may be more compact than the constant velocity universal joint with six balls. In this case, vehicle body attachment flanges 23 may be provided in all the eight outer circumferential recesses 25 as shown in FIG. 4, or the flanges 23 may be formed in four outer circumferential recesses 25 at equal intervals in the circumferential direction of the joint outer ring 21 as shown in FIG. 5.

A constant velocity universal joint of an embodiment of the invention shown in FIGS. 6 to 9 includes an outer ring 110, an inner ring 120, balls 130, and a cage 140 as essential elements. The outer ring 110 is in the shape of a cup having one end opened and has a shaft portion 116 coupled to a rotating shaft on the opposite side to the open end. The inner circumferential surface 112 of the outer ring 110 is cylindrical, and six axially extending track grooves 114 are formed in the inner circumferential surface of the cylinder. The inner ring 120 has a spherical outer circumferential surface 122, and six axially extending track grooves 124 are formed in the spherical outer circumferential surface 122. The inner ring 120 has a serration hole 126 to couple with the rotating shaft. The track grooves 114 of the outer ring 110 and the track grooves 124 of the inner ring 120 are paired to define ball tracks, and one ball 130 is incorporated in each ball track. The balls 130 are interposed between the outer ring 110 and the inner ring 120 to transmit torque. The balls 130 are held in pockets 146 in the cage 140. The cage 140 is in contact with the cylindrical inner circumferential surface portion 112 of the outer ring 110 at the outer spherical surface portion 142, and in contact with the spherical outer circumferential surface 122 of the outer ring 120 at the inner spherical surface portion 144. Therefore, angular displacement can be made between the outer ring 110 and the cage 140 and between the cage 140 and the inner ring 120. A sub unit consisting of the inner ring 120, the balls 130, and the cage 140 can slide relative to the outer ring 110 in the axial direction of the outer ring 110. As shown in FIG. 9b, the center Oo of the outer spherical surface portion 142 of the cage 140 and the center Oi of the inner spherical surface portion 144 are offset from each other by an equal distance axially in the opposite directions from the center O of the pocket. Therefore, when the joint transmits torque at a certain operation angle, the balls are always located in the bisector plane of the angle formed by the rotating axis of the outer ring 110 and the rotating axis of the inner ring 120, so that the constant velocity of the joint can be secured.

Figure 6:
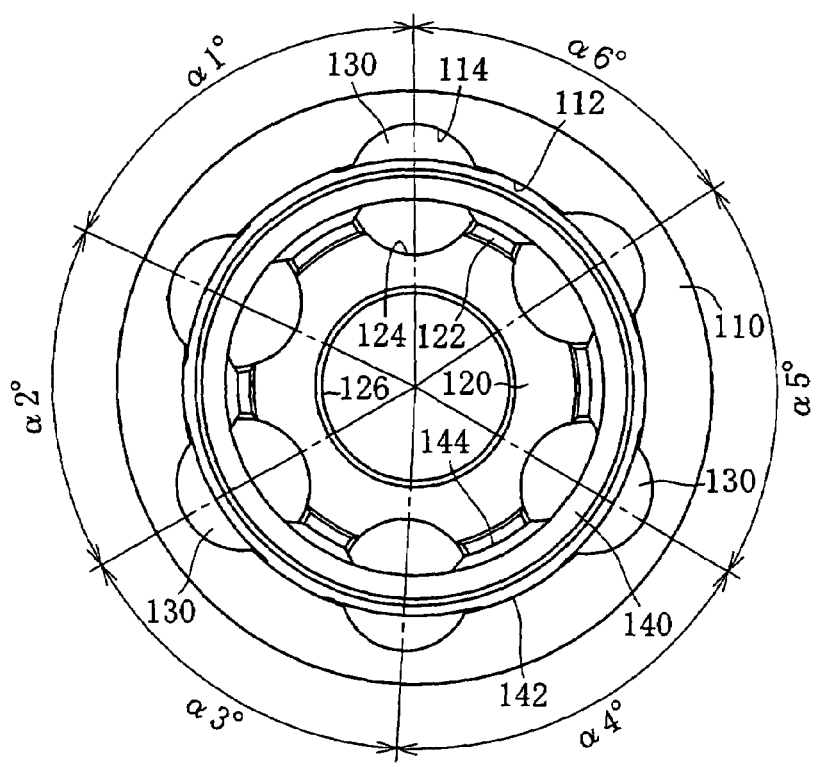
FIG. 6 is a front view of a six-ball DOJ according to an embodiment of the invention.
Figure 7:
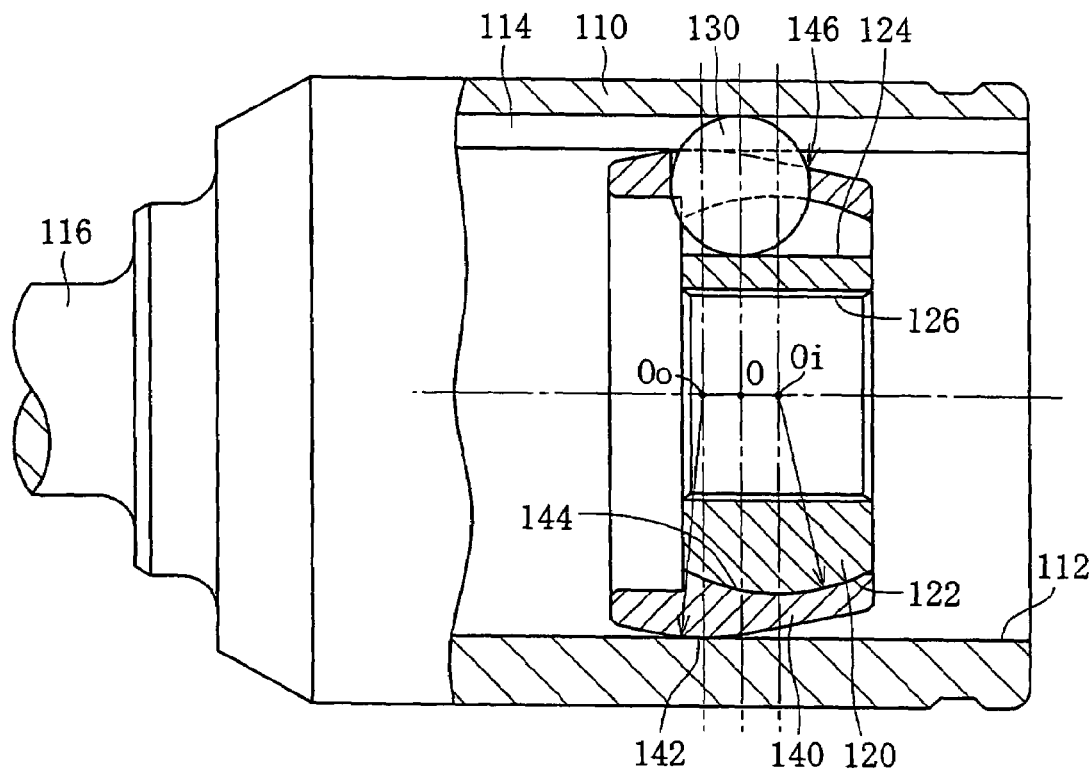
FIG. 7 is a longitudinal sectional view of the DOJ shown in FIG. 6.
Figure 8A:
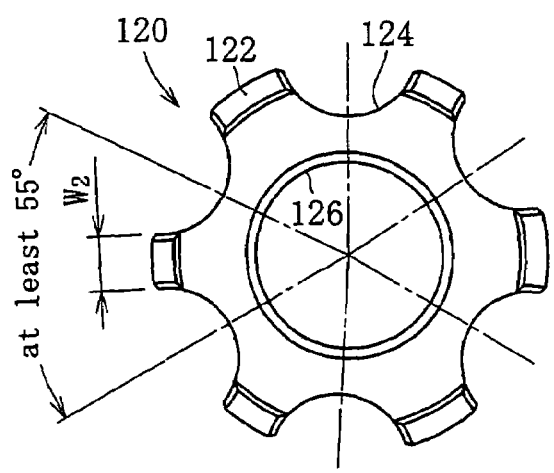
FIG. 8a is a cross sectional view of the inner member in the DOJ of FIG. 6.
Figure 8B:
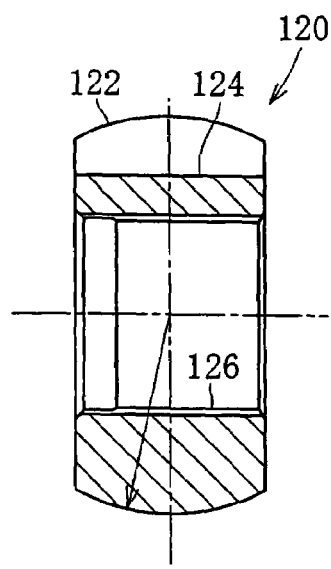
FIG. 8b is a longitudinal sectional view thereof.

According to the embodiment, the pitches $\alpha_1$ to $\alpha_6$ of the ball tracks are random and not less than 55°. More specifically, as shown in FIGS. 6 and 8, the pitches of the track grooves 114 of the outer ring 110 and the track grooves 124 of the inner ring 120 are random and not less than 55° (see Examples 1 to 3 in Table 1). The lower limit for the pitch is set as 55°, so that prescribed sizes for the spherical surface width $W_2$ of the inner ring 120 and the inter-pocket column width $W_1$ of the cage 140 necessary in consideration of the strength of the inner ring 120 and the cage 140 can be secured. According to the embodiment, as shown in FIG. 9, the pitch of the pockets 146 of the cage 140 is also random and not less than 55° as with the pitches of the track grooves 114 of the outer ring 110 and the track grooves 124 of the inner ring 120. Consequently, at the time of assembling the joint, the outer ring 110, the inner ring 120, and the cage 140 should be adjusted to be in phase. The window length $L_1$ of the pockets 146 of the cage 140 is equal. The window length $L_1$ of the pocket 146 is set in consideration of the circumferential movement of the ball 130 based on the maximum operation angle of the joint.

Figure 11A:
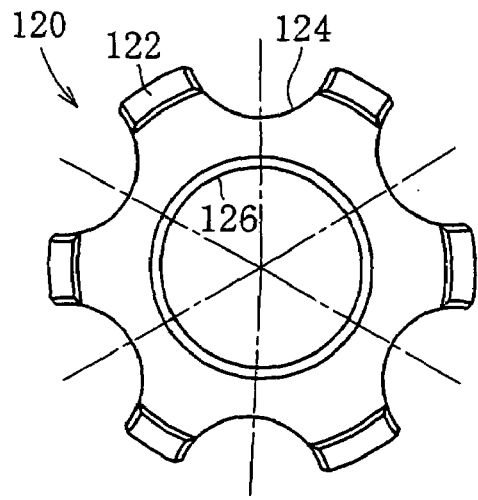
FIG. 11a is a cross sectional view of the inner member in the DOJ of FIG. 10.
Figure 11B:
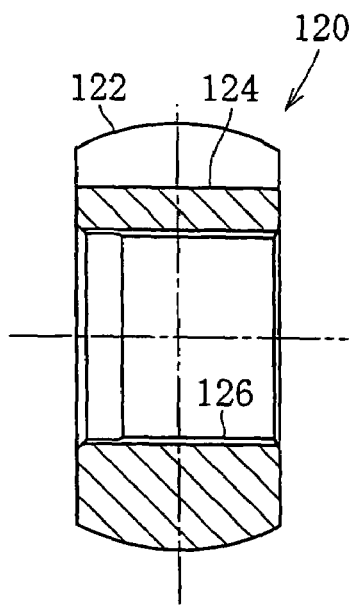
FIG. 11b is a longitudinal sectional view thereof.
Figure 12A:
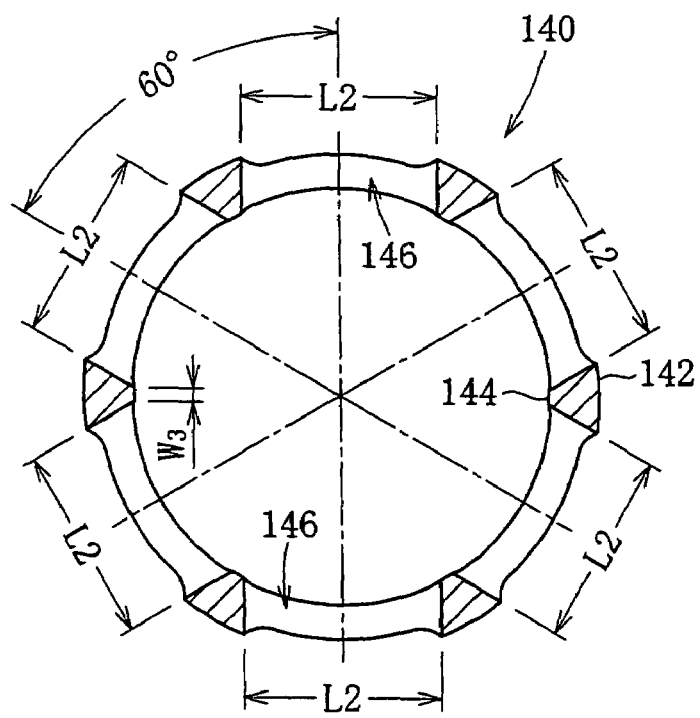
FIG. 12a is a front view of the cage in the DOJ of FIG. 10.
Figure 12B:
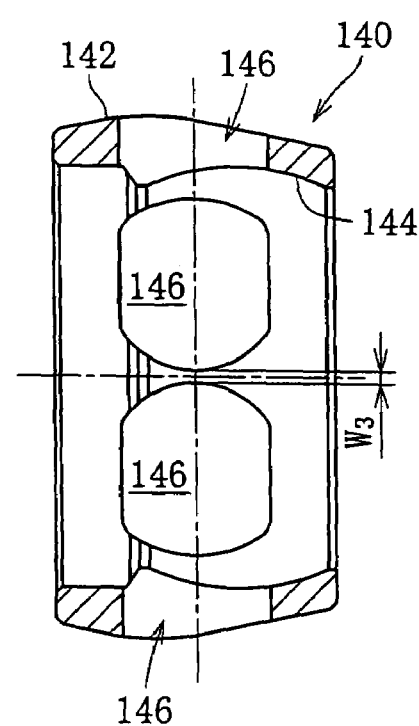
FIG. 12b is a cross sectional view thereof.

Now, an embodiment of the invention shown in FIGS. 10 to 12 will be described. Note that the basic structure of the DOJ is the same as that of the embodiment in FIGS. 6 to 9, and therefore substantially the same elements or parts will be denoted by the same reference characters. As shown in FIGS. 10 and 11, according to the embodiment, the pitches $\alpha_1$ to $\alpha_6$ of the track grooves 114 of the outer ring 110 and the track grooves 124 of the inner ring 120 are unequal pitches in the range of 60°±3° (see Example 4 in Table 1). When the pitch is limited to the range of 60°±3°, the necessary size for the inter-pocket column width $W_3$ in consideration of the strength of the cage 140 is secured. In this example, as shown in FIG. 12, the pockets 146 of the cage 140 are provided at equal pitch intervals (60°), and the window length $L_2$ of the pockets 146 is equal. The window length $L_2$ of the pocket 146 is set in consideration of the deviation of the ball track pitch (60°±3°) and the circumferential movement of the balls 130 based on the maximum operation angle of the joint. The pockets 146 of the cage 140 are equal in length and provided with equal pitch, phase adjustment is necessary only for the outer ring 110 and the inner ring 120 at the time of assembling the joint, which can be carried out significantly easily.

Figure 13:
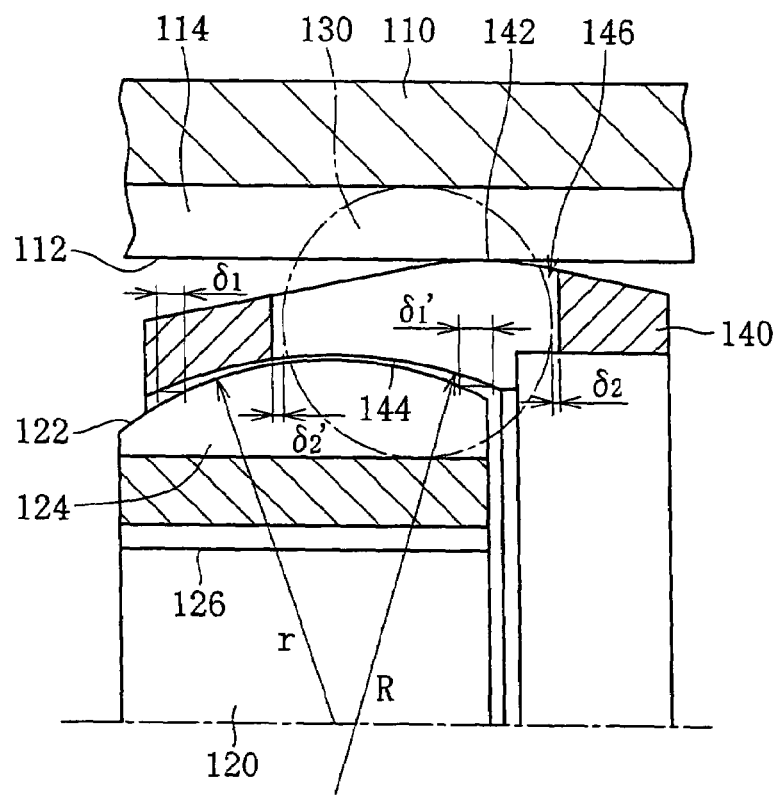
FIG. 13 is a longitudinal sectional view of an inner ring and a cage according to another embodiment.
Figure 14:
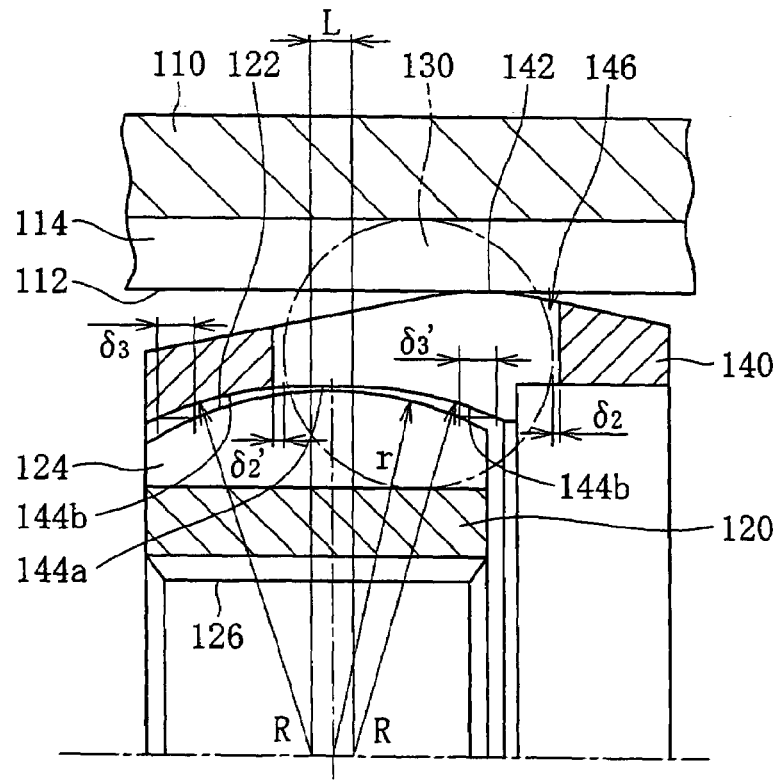
FIG. 14 is a longitudinal sectional view of an inner ring and a cage according to yet another embodiment.
Figure 15:
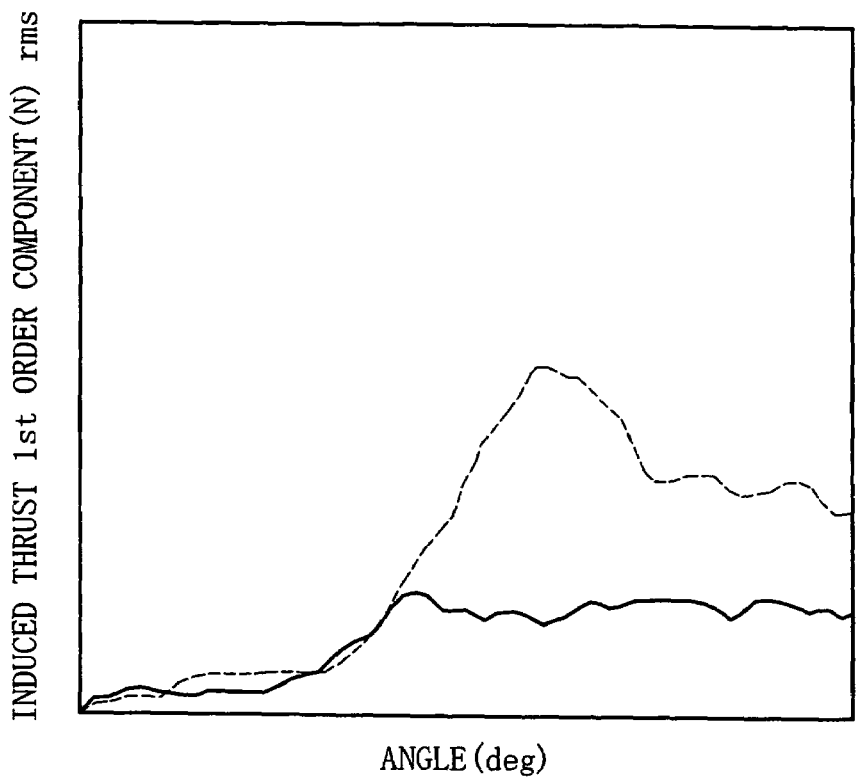
FIG. 15 is a graph representing measurement results for a 1st order component of induced thrust.
Figure 16:
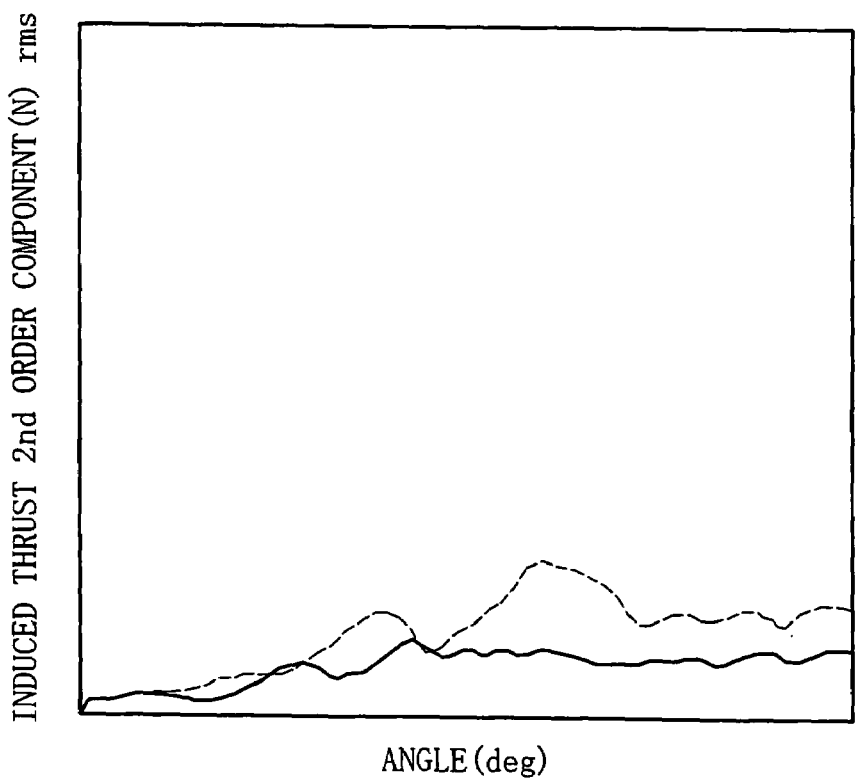
FIG. 16 is a graph representing measurement results for a 2nd order component of induced thrust.
Figure 17:
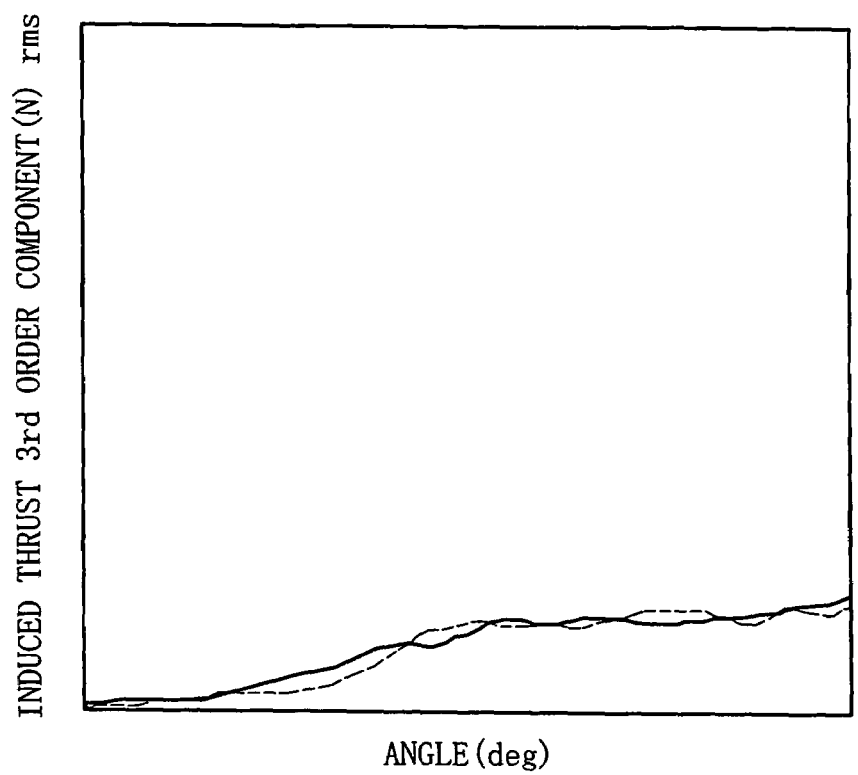
FIG. 17 is a graph representing measurement results for a 3rd order component of induced thrust.
Figure 18:
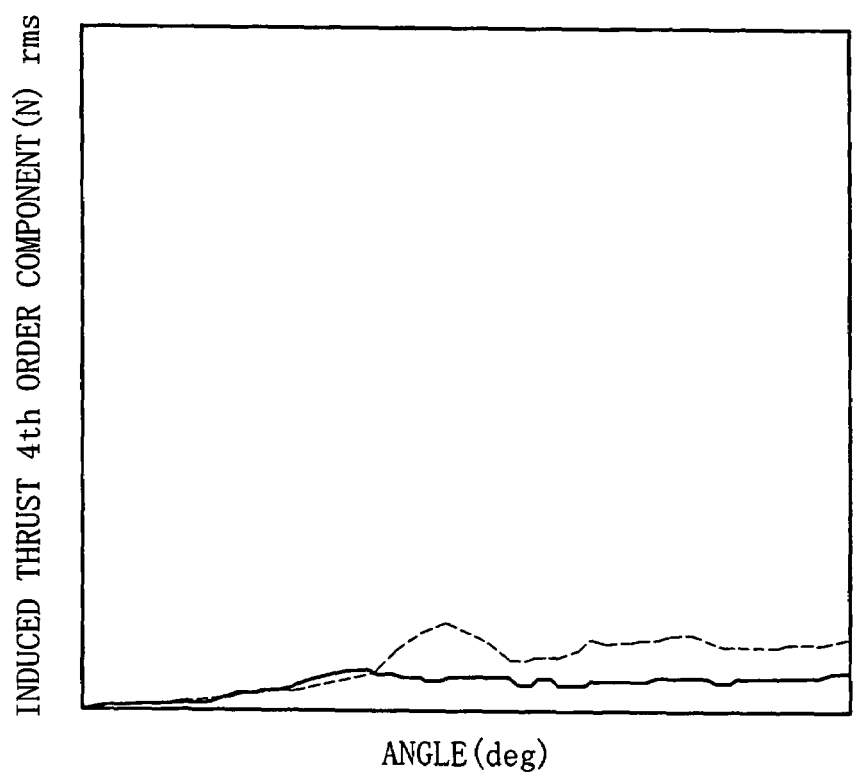
FIG. 18 is a graph representing measurement results for a 4th order component of induced thrust.
Figure 19:
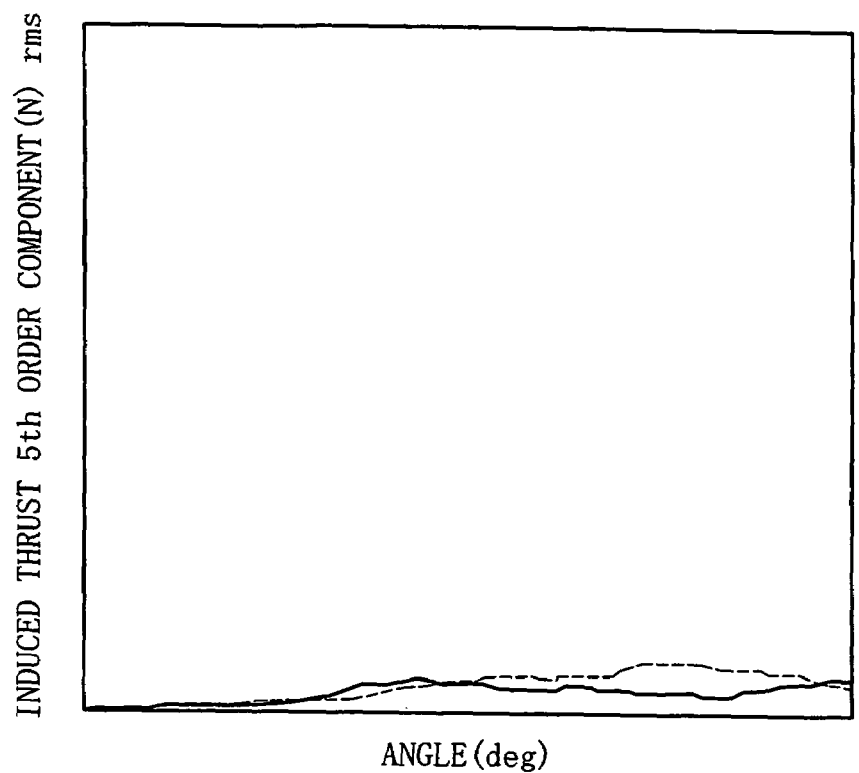
FIG. 19 is a graph representing measurement results for a 5th order component of induced thrust.
Figure 20:
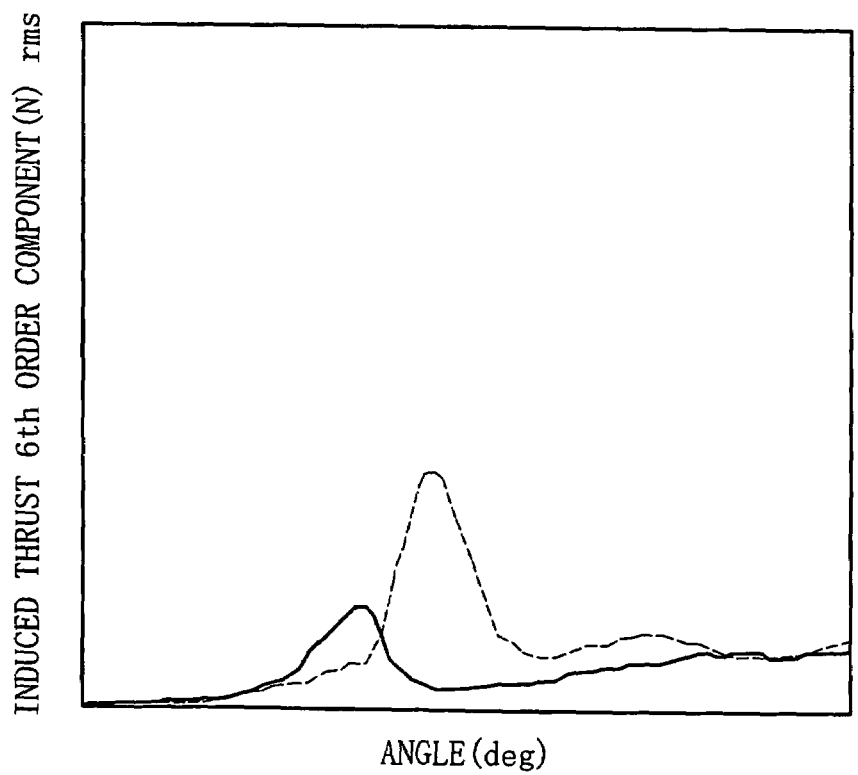
FIG. 20 is a graph representing measurement results for a 6th order component of induced thrust.

According to an embodiment shown in FIGS. 13 and 14, the inner ring 120 and the cage 140 can move axially relative to each other, and the balls are released from restriction, so that they can more easily turn. In the embodiment shown in FIG. 13, the radius curvature (r) of the spherical outer circumferential surface 122 of the inner ring 120 is set to be smaller than the radius curvature (R) of the inner spherical surface portion 144 of the cage 140, and the center of curvature of the spherical outer circumferential surface 122 of the inner ring 120 and the center of curvature of the inner spherical surface portion 144 of the cage 140 are radially shifted. In this way, axial clearances $\delta_1$ and $\delta_1'$ are formed between the outer spherical surface 122 of the inner ring 120 and the inner spherical surface portion 144 of the cage 140, and the clearances $\delta_1$ and $\delta_1'$ allow the inner ring 120 to be axially displaced relative to the cage 140.

In the embodiment shown in FIG. 14, the inner circumferential surface of the cage 140 is formed by connecting a cylindrical surface 144a for a size (L) in the axial direction in the center and partial spherical surfaces 144b on its both sides. The radius of curvature (R) of the partial spherical surface 144b is equal to the radius of curvature (r) of the spherical outer circumferential surface 122 of the inner ring 120, and there is a clearance 63 and 631 between the spherical outer circumferential surface 122 of the inner ring 120 and the inner circumferential surfaces (144a and 144b) of the cage 140.

In the embodiment shown in FIGS. 13 and 14, there are clearances $\delta_2$ and $\delta_2'$ between the wall of the cage 140 opposing the axial direction of the pocket 146 and the ball 130. The clearances $\delta_2$ and $\delta_2'$ are set in the range of from 5 to 50 µm in order to release the ball 130 from restriction, and in consideration of the effect of collision between the ball 130 and the cage 140. The upper limit for the clearances $\delta_2 \delta_2'$ is 50 µm because for a clearance larger than 50 µm, not only the striking noise caused by the collision between the ball 130 and the cage 140 is large, but also the stability of the cage 140 is impaired by the impact upon the collision, which gives rise to increased vibrations. The lower limit is 5 µm though it would be possible to set the lower limit to zero in theory since the ball 130 is to be released from restriction. This is for surely eliminating fastening allowance and securing $\delta_2$ and $\delta_2'$ for convenience of manufacture and maintenance.

In the embodiment shown in FIGS. 13 and 14, the clearances $\delta_1$ and $\delta_1'$ or $\delta_3$ and $\delta_3'$ allow the inner ring 120 and the cage 140 to be relatively moved in the axial direction, and the ball 130 can turn without resistance as it is not restricted by the pocket 146 of the cage 140, so that the slide resistance for the axial relative movement of the outer ring 110 and the inner ring 120 is very small. Therefore, vibrations from the engine side as the torque is loaded are absorbed by smooth, slight relative movement between the outer ring 110 and the inner ring 120 through the cage 140 and are not transmitted to the vehicle body. Since the slide resistance inside the joint is small, angular displacement and axial displacement are extremely smoothly carried out.

In the described embodiment, the six balls 130 are used, and the induced force can similarly be reduced by employing unequal pitches in cases other than where the number of the balls 130 is six. Note however that the range of setting the pitches is determined based on the relation between the number of balls 130 and the operation angle. The relation between the operation angle and the ball track pitch for a six-ball DOJ and an eight-ball DOJ is given in following Tables 2 and 3.

TABLE 2

| Maximum operation angle (°) | Ball track pitch | |
|---|---|---|
| | Pockets with unequal pitches | Pockets with equal pitch |
| 15 to 20 | at least 53° | 60° ± 4° |
| 20 to 25 | at least 55° | 60° ± 3° |
| 25 to 30 | at least 57° | 60° ± 2° |

TABLE 3

| Maximum operation angle (°) | Ball track pitch | |
|---|---|---|
| | Pockets with unequal pitches | Pockets with equal pitch |
| 15 to 20 | at least 39° | 45° ± 3° |
| 20 to 25 | at least 41° | 45° ± 2° |
| 25 to 30 | at least 43° | 45° ± 1° |

The invention claimed is:

1. A slide type constant velocity universal joint comprising:

an outer member provided with a plurality of track grooves formed in an inner circumference thereof;

an inner member provided with track grooves corresponding to the track grooves of the outer member in an outer circumference;

a plurality of balls provided in ball tracks defined by cooperation of the track grooves between said outer member and the inner member to transmit torque; and a cage having pockets for retaining said balls, wherein a plurality of vehicle body attachment flanges are provided apart in a circumferential direction at an outer end of said outer member so as to outwardly protrude partially, the outer circumferential shape of said outer member is in a flower shape corresponding to the inner circumferential shape and having outer circumferential recesses, wherein only one track groove is positioned between every pair of adjacent outer circumferential recesses, the vehicle body attachment flanges being formed at the outer circumferential recesses.

2. A slide type constant velocity universal joint according to claim 1, wherein the outer circumferential shape of the outer member has a ratio of an outermost diameter size where the track grooves are positioned and an innermost diameter size where the vehicle body attachment flanges are located is set in the range of from 0.85 to 0.95.

3. A slide type constant velocity universal joint according to claim 1, wherein the number of said balls is eight.

* * * * *